United States Patent
Nagaoka

(10) Patent No.: US 9,495,757 B2
(45) Date of Patent: Nov. 15, 2016

(54) IMAGE PROCESSING APPARATUS AND IMAGE PROCESSING METHOD

(71) Applicant: Panasonic Intellectual Property Management Co., Ltd., Osaka-shi, Osaka (JP)

(72) Inventor: Eiichi Nagaoka, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 276 days.

(21) Appl. No.: 14/225,445

(22) Filed: Mar. 26, 2014

(65) Prior Publication Data
US 2014/0294301 A1    Oct. 2, 2014

(30) Foreign Application Priority Data

Mar. 27, 2013  (JP) ................................. 2013-065902
Mar. 13, 2014  (JP) ................................. 2014-050326

(51) Int. Cl.
*G06K 9/34*    (2006.01)
*G06T 7/00*    (2006.01)

(52) U.S. Cl.
CPC ........... *G06T 7/0091* (2013.01); *G06T 7/0081* (2013.01); *G06T 2207/20021* (2013.01); *G06T 2207/20036* (2013.01); *G06T 2207/20104* (2013.01)

(58) Field of Classification Search
CPC .............. G06T 7/0081; G06T 7/0091; G06T 2207/20021; G06T 2207/20036; G06T 2207/20104
(Continued)

(56) References Cited

U.S. PATENT DOCUMENTS

| 5,887,080 A | 3/1999 | Tsubusaki et al. |
| 6,289,123 B1 | 9/2001 | Xiaomang et al. |

(Continued)

FOREIGN PATENT DOCUMENTS

| JP | H05-216992 A | 8/1993 |
| JP | H07-078263 A | 3/1995 |

(Continued)

OTHER PUBLICATIONS

Office Action from the co-pending U.S. Appl. No. 14/243,913 issued on May 21, 2015.
(Continued)

*Primary Examiner* — Mekonen Bekele
(74) *Attorney, Agent, or Firm* — Shinjyu Global IP

(57) ABSTRACT

In the image processing apparatus, the control unit generates a plurality of divided regions by dividing the image in accordance with similarity calculated based on pixel values and pixel locations, and identifies a selection range constituted by one or more of the plurality of divided regions in accordance with the selection operation received by the input unit. The control unit performs erosion processing with respect to the selection range by reducing a number of pixels constituting the selection range, and performs dilation processing with respect to the selection range resulting from the erosion processing by increasing the number of pixels constituting the selection range resulting from the erosion processing. The number of pixels constituting the selection range resulting from the dilation processing is greater than the number of pixels constituting the selection range before the erosion processing.

7 Claims, 17 Drawing Sheets

(58) Field of Classification Search
USPC ......... 382/173, 275, 103, 159; 345/158, 420
See application file for complete search history.

(56) References Cited

U.S. PATENT DOCUMENTS

| | | | |
|---|---|---|---|
| 6,583,823 B1 | 6/2003 | Shimada et al. | |
| 7,411,612 B2 | 8/2008 | Yamada et al. | |
| 7,961,951 B2 | 6/2011 | Tsutsumi | |
| 8,009,909 B2 | 8/2011 | Hirai et al. | |
| 8,023,014 B2 | 9/2011 | Kim et al. | |
| 8,027,535 B2 | 9/2011 | Sanami | |
| 8,208,752 B2 | 6/2012 | Ishii | |
| 8,229,674 B2* | 7/2012 | Guittet | G06K 9/0014 |
| | | | 702/19 |
| 8,306,324 B2 | 11/2012 | Sanami | |
| 8,472,076 B2 | 6/2013 | Ikeda | |
| 9,171,108 B2* | 10/2015 | Chen | G06F 17/5004 |
| 2002/0015526 A1 | 2/2002 | Nomura et al. | |
| 2004/0208395 A1 | 10/2004 | Nomura | |
| 2005/0057657 A1 | 3/2005 | Yamada et al. | |
| 2005/0089241 A1 | 4/2005 | Kawanishi et al. | |
| 2005/0129326 A1 | 6/2005 | Matama | |
| 2006/0082595 A1* | 4/2006 | Liu | G06K 9/00449 |
| | | | 345/629 |
| 2006/0256383 A1 | 11/2006 | Yamakawa | |
| 2007/0035790 A1 | 2/2007 | Kotani | |
| 2007/0201744 A1 | 8/2007 | Sanami | |
| 2008/0158386 A1 | 7/2008 | Miki | |
| 2008/0240608 A1 | 10/2008 | Ishii | |
| 2009/0153923 A1* | 6/2009 | Lin | G06K 15/02 |
| | | | 358/505 |
| 2009/0245678 A1* | 10/2009 | Ming | G06T 5/30 |
| | | | 382/257 |
| 2010/0066761 A1 | 3/2010 | Tousch et al. | |
| 2011/0032581 A1 | 2/2011 | Ikeda | |
| 2011/0304637 A1 | 12/2011 | Sanami | |
| 2012/0230591 A1 | 9/2012 | Shibata | |
| 2013/0016246 A1 | 1/2013 | Hatanaka et al. | |
| 2013/0051679 A1 | 2/2013 | Tsuda et al. | |
| 2013/0081982 A1* | 4/2013 | Tanaka | B07C 5/3425 |
| | | | 209/552 |
| 2013/0287259 A1 | 10/2013 | Ishii | |
| 2013/0293469 A1* | 11/2013 | Hakoda | G06F 3/048 |
| | | | 345/158 |
| 2014/0355831 A1* | 12/2014 | Han | G06T 7/0081 |
| | | | 382/103 |

FOREIGN PATENT DOCUMENTS

| | | |
|---|---|---|
| JP | H07-282219 A | 10/1995 |
| JP | H09-016368 A | 1/1997 |
| JP | H09-270022 A | 10/1997 |
| JP | H11-039480 A | 2/1999 |
| JP | H11-103447 A | 4/1999 |
| JP | 2003-108980 A | 4/2003 |
| JP | 2003-123066 A | 4/2003 |
| JP | 2004-318696 A | 11/2004 |
| JP | 2005-092284 A | 4/2005 |
| JP | 3824237 B2 | 9/2006 |
| JP | 2006-279442 A | 10/2006 |
| JP | 2006-279443 A | 10/2006 |
| JP | 2006-311080 A | 11/2006 |
| JP | 2007-060325 A | 3/2007 |
| JP | 2007-110329 A | 4/2007 |
| JP | 2007-128238 A | 5/2007 |
| JP | 2007-226671 A | 9/2007 |
| JP | 2008-092447 A | 4/2008 |
| JP | 2008-164758 A | 7/2008 |
| JP | 2008-244867 A | 10/2008 |
| JP | 2008-299516 A | 12/2008 |
| JP | 2008-299591 A | 12/2008 |
| JP | 2008-300990 A | 12/2008 |
| JP | 2009-181528 A | 8/2009 |
| JP | 2010-511215 A | 4/2010 |
| JP | 2011-035567 A | 2/2011 |
| JP | 2011-055488 A | 3/2011 |
| JP | 4652978 B2 | 3/2011 |
| JP | 2011-170838 A | 9/2011 |
| JP | 2011-170840 A | 9/2011 |
| JP | 2011-191860 A | 9/2011 |
| JP | 2012-088796 A | 5/2012 |
| JP | 2013-045316 A | 3/2013 |
| WO | 2009/142333 A1 | 11/2009 |
| WO | 2011/061943 A1 | 5/2011 |
| WO | 2013/073168 A1 | 5/2013 |

OTHER PUBLICATIONS

Office Action from the corresponding Japanese Patent Application No. 2014-050332 issued on Mar. 10, 2015.
Office Action from the corresponding Japanese Patent Application No. 2014-050324 issued on Mar. 17, 2015.
Office Action from the corresponding Japanese Patent Application No. 2014-050326 issued on Apr. 14,2015.
Office Action from the co-pending U.S. Appl. No. 14/225,426 issued on Aug. 16, 2016.

* cited by examiner

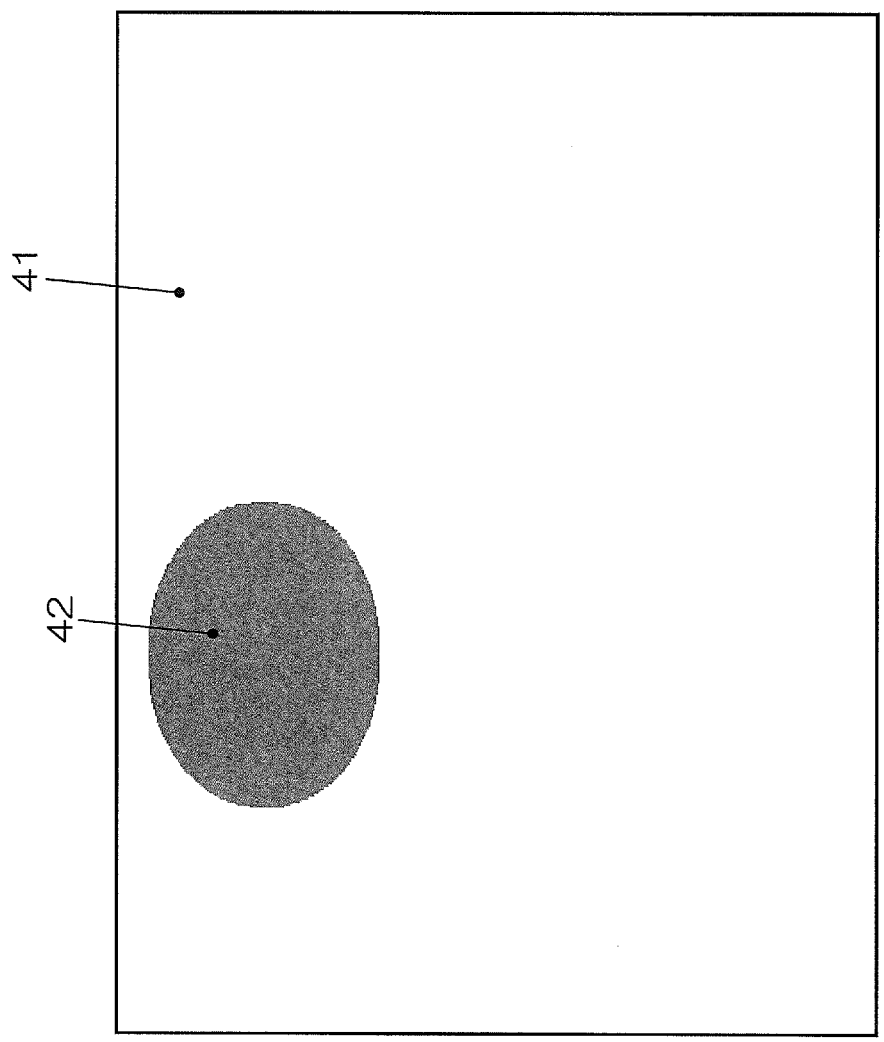

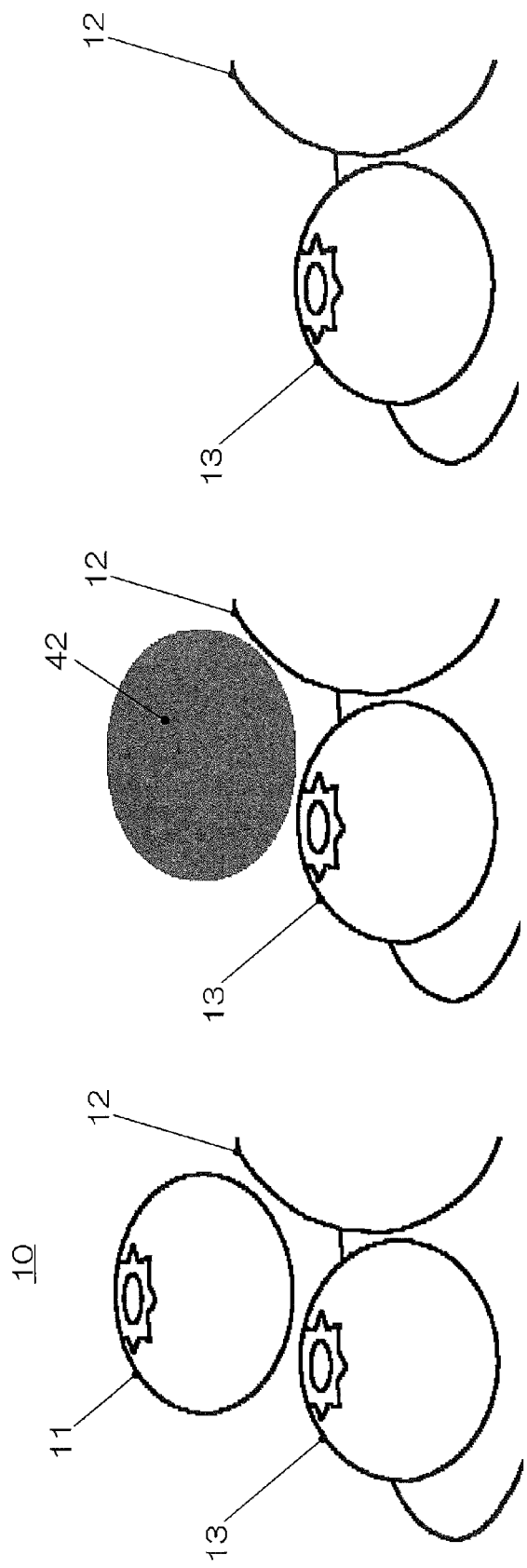

IMAGE PROCESSING APPARATUS AND IMAGE PROCESSING METHOD

PRIORITY

This application claims priority to Japanese Patent Application No. 2013-065902 filed on Mar. 27, 2013 and No. 2014-50326 filed on Mar. 13, 2014. The entire disclosure of Japanese Patent Application No. 2013-065902 and No. 2014-50326 is hereby incorporated herein by reference.

BACKGROUND

1. Technical Field

The present disclosure relates to image processing performed on a selection range designated by a user in an image processing apparatus that allows a user to designate a portion of an image and perform image processing on that portion, for example.

2. Background Art

There are cases where a displayed image includes an unnecessary object, which is an object thought to be unnecessary by a user (such as facial wrinkles or moles, or electric cables in the background). Conventionally, a function for removing such an unnecessary object from the image and performing inpainting processing to prevent unnaturalness has been proposed. Specifically, after the user designates a specific region of an image as an unnecessary region, inpainting processing is performed on the unnecessary region using the surrounding portion of the image or the like, as disclosed in Japanese Laid-open Patent Publication 2013-045316A, for example. As the unnecessary region designation method performed by the user, it is common to designate the unnecessary region in units of pixels, such as the case where the user uses a digitizer or a pointing device such as a mouse to trace the outline portion of the unnecessary object while referencing an image displayed on a display.

SUMMARY

The present disclosure provides an image processing apparatus and an image processing method for performing image region designation that is effective for obtaining more natural processing results in, for example, image inpainting processing for removing an unnecessary object.

An image processing apparatus according to one aspect of the present disclosure is an image processing apparatus that performs region designation with respect to a displayed image, including: a display unit configured to display an image constituted by a predetermined number of pixels; an input unit configured to receive a selection operation with respect to the image; and a control unit configured to control the display unit and the input unit. The control unit is further configured to generate a plurality of divided regions by dividing the image in accordance with similarity calculated based on pixel values and pixel locations, and identify a selection range constituted by one or more of the plurality of divided regions in accordance with the selection operation received by the input unit. The control unit is further configured to perform erosion processing with respect to the selection range by reducing a number of pixels constituting the selection range, and perform dilation processing with respect to the selection range resulting from the erosion processing by increasing the number of pixels constituting the selection range resulting from the erosion processing. The number of pixels constituting the selection range resulting from the dilation processing is greater than the number of pixels constituting the selection range before the erosion processing.

An image processing method according to another aspect of the present disclosure is an image processing method for performing region designation with respect to an image displayed on a display apparatus, including: generating a plurality of divided regions by dividing the image constituted by a predetermined number of pixels in accordance with similarity calculated based on pixel values and pixel locations; specifying a selection range constituted by one or more of the plurality of divided regions in accordance with a selection operation by a user; performing erosion processing with respect to the selection range by reducing a number of pixels constituting the selection range; and performing dilation processing with respect to the selection range resulting from the erosion processing by increasing the number of pixels constituting the selection range resulting from the erosion processing. The number of pixels constituting the selection range resulting from the dilation processing is greater than the number of pixels constituting the selection range before the erosion processing.

The image processing apparatus and the image processing method of the present disclosure are effective in performing image region designation for obtaining more natural processing results in, for example, image inpainting processing for removing an unnecessary object.

BRIEF DESCRIPTION OF THE DRAWINGS

FIGS. 13A and 13B are diagrams showing the state of the binary image after dilation processing in units of pixels.

FIG. 14 is a diagram showing the selection range after dilation processing.

FIGS. 15A to 15C are diagrams for describing image inpainting processing for removing an unnecessary object.

DETAILED DESCRIPTION

Hereinafter, embodiments of the present disclosure will be described in detail with reference to the drawings as appropriate. Note that there are cases where descriptions in greater detail than necessary will not be given. For example, there are cases where detailed descriptions will not be given for well-known matter, and where redundant descriptions will not be given for configurations that are substantially the same. The purpose of this is to avoid unnecessary redundancy in the following description and to facilitate understanding by a person skilled in the art. It will be apparent to those skilled in the art from this disclosure that the following descriptions of the embodiments are provided for illustration only and not for the purpose of limiting the invention as defined by the appended claims and their equivalents.

Note that the accompanying drawings and following description are provided for sufficient understanding of the present disclosure by a person skilled in the art, and are not intended to limit the subject matter recited in the claims.

Embodiment 1

Figure 1:
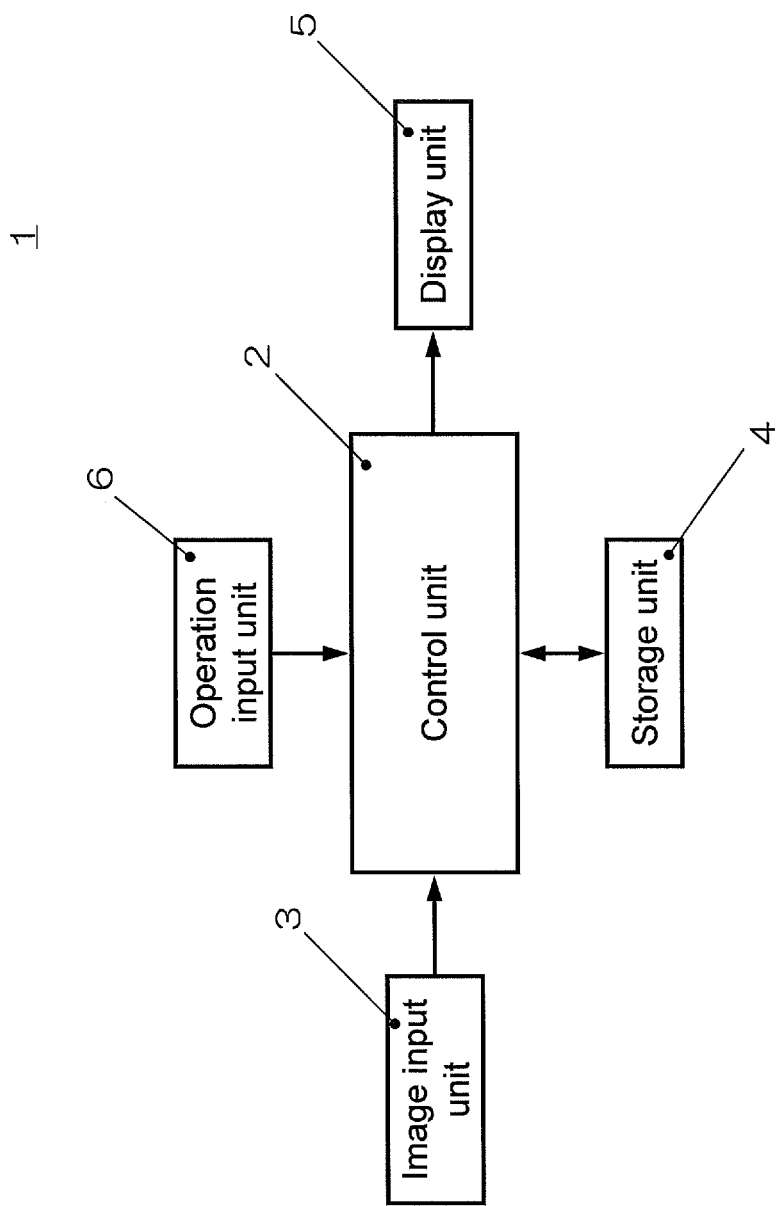
FIG. 1 is a block diagram showing a schematic configuration of an image processing apparatus 1 according to an embodiment.

The following describes Embodiment 1 with reference to FIGS. 1 to 17.
1. Configuration FIG. 1 is a block diagram schematically showing the configuration of an image processing apparatus 1. The image processing apparatus 1 is any electronic device, such as a digital still camera, a digital video camera, a personal computer, a mobile phone, or an information terminal. The image processing apparatus 1 includes a control unit 2 (example of a control unit) that performs overall control of operations of units in the image processing apparatus 1; an image input unit 3, such as a camera or a scanner, that includes a lens and an imaging device and captures images; a storage unit 4 that records various types of information such as captured images; a display unit 5 (example of a display unit), such as a liquid crystal monitor or an organic EL display, that displays image information such as images; and an operation input unit 6 (example of an input unit), such as a touch panel, that receives an input of various types of operations from a user. The input unit 6 detects that the user's finger or the like has touched the screen of the display unit 5, and a detection result is obtained by a determination made by the control unit.

The control unit 2 includes a processor such as a CPU, and executes operations of the image processing apparatus 1 by executing processing in a predetermined program. The storage unit 4 may be constituted by a hard disk, a silicon disk, an SD card (semiconductor memory), or the like. The storage unit 4 may be constituted by an element that performs temporary storage, such as a cache or a RAM.

Also, the operation input unit 6 may be a pointing device such as a mouse or a tablet, or may be a keyboard. Alternatively, the operation input unit 6 may be an electronic pen of any of various systems, or the like.
2. Operations
  2-.1. Operations of Image Processing Apparatus Operations of the image processing apparatus 1 configured as described above will be described below with reference to the flowchart of FIG. 2. In accordance with an instruction given through a user operation, the control unit 2 of the image processing apparatus 1 causes an image captured by the image input unit 3 to be displayed on the display unit 5. In this case, an image captured by the image input unit 3 is stored in the storage unit 4 in advance, and that image is read out from the storage unit 4 and displayed on the display unit 5 (step S101).

Next, the control unit 2 performs segment division processing for dividing the image into multiple small regions (segments) based on similarity between values of the pixels of the image (step S102).

When the user selects one or more small regions out of the divided small regions (segments), the control unit 2 performs region designation processing for designating a region to be a target of image processing (step S103).

Next, the control unit 2 performs binary image processing for generating a binary image in which all of the pixels included in the small regions (segments) selected by the user are set as the selection range (step S104).

The control unit 2 then performs image inpainting processing that excludes an unwanted region that has gone through the binary image processing (step 105).

The operations in the segment division processing (step S102), the region designation processing (step S103), the binary image processing (step S104), and the image inpainting processing (step S105) will be described in detail.
  2-2. Operations in Segment Division Processing The following describes the segment division processing, which is for dividing an image into multiple small regions (example of divided regions, which will be referred to hereinafter as "segments") based on similarity between values of the pixels of the image. In the present embodiment, a segment division method based on k-means clustering is used as the segment division processing.

Figure 3:
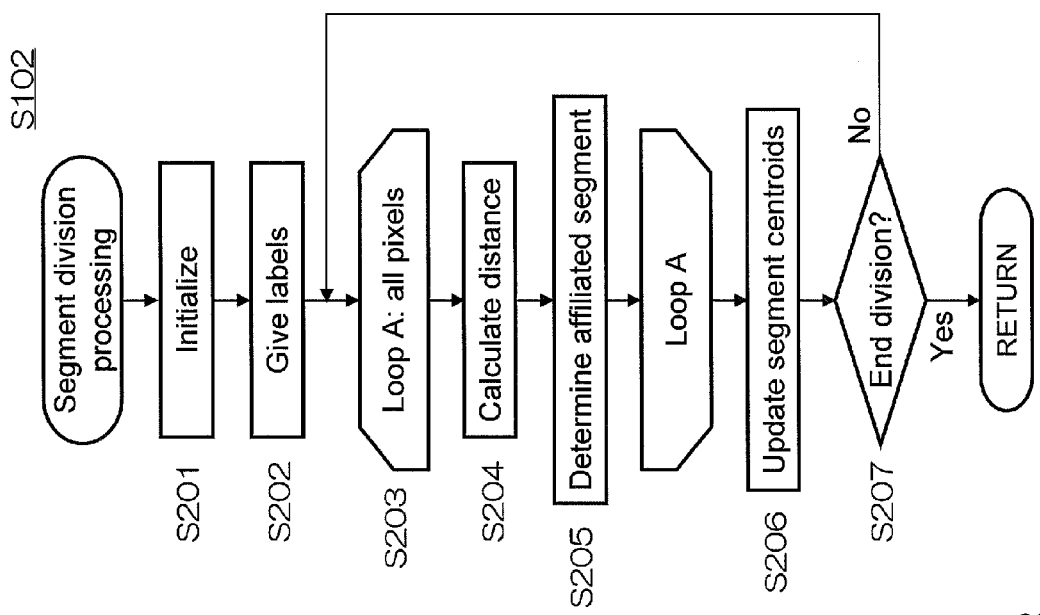
FIG. 3 is a flowchart showing operations in segment division processing performed by the image processing apparatus 1.
Figure 5:
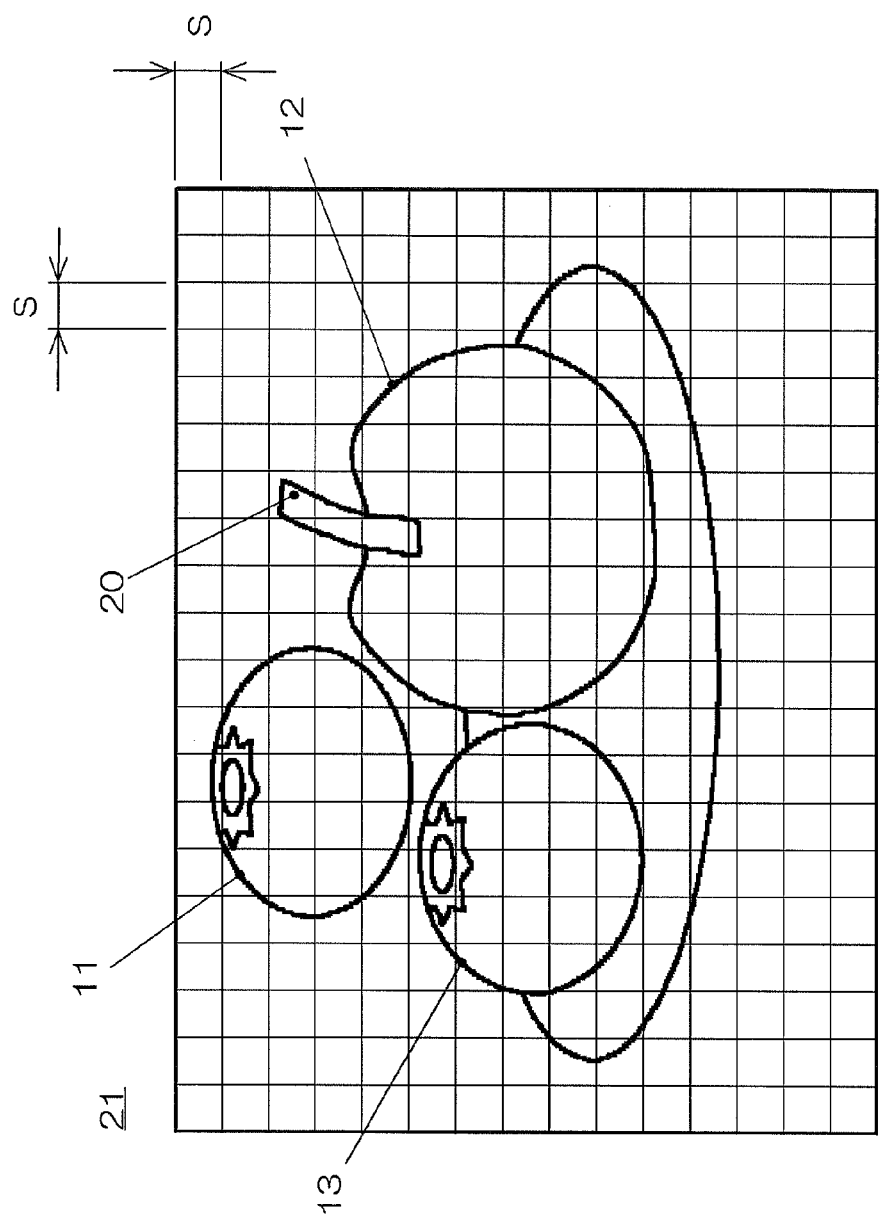
FIG. 5 is a diagram showing an initial state in the segment division processing performed by the image processing apparatus 1.
Figure 6:
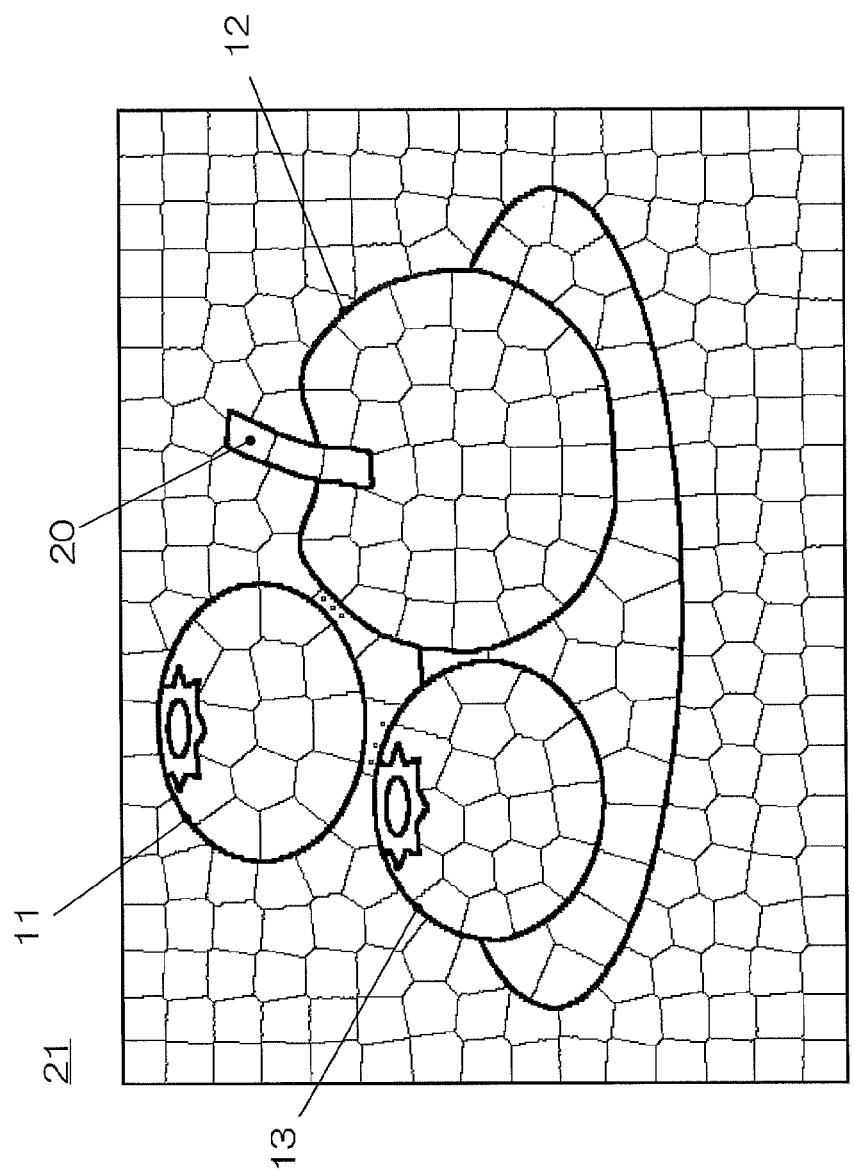
FIG. 6 is a diagram showing a processing result of the segment division processing performed by the image processing apparatus 1.

FIG. 3 is a flowchart showing operations in the segment division processing. Also, FIG. 4 is a diagram showing the display state of an input image that is displayed on the liquid crystal monitor and is to be the target of processing, FIG. 5 is a diagram for showing the initial state in the segment division processing, and FIG. 6 is a diagram for showing processing results of the segment division processing.

Figure 4:
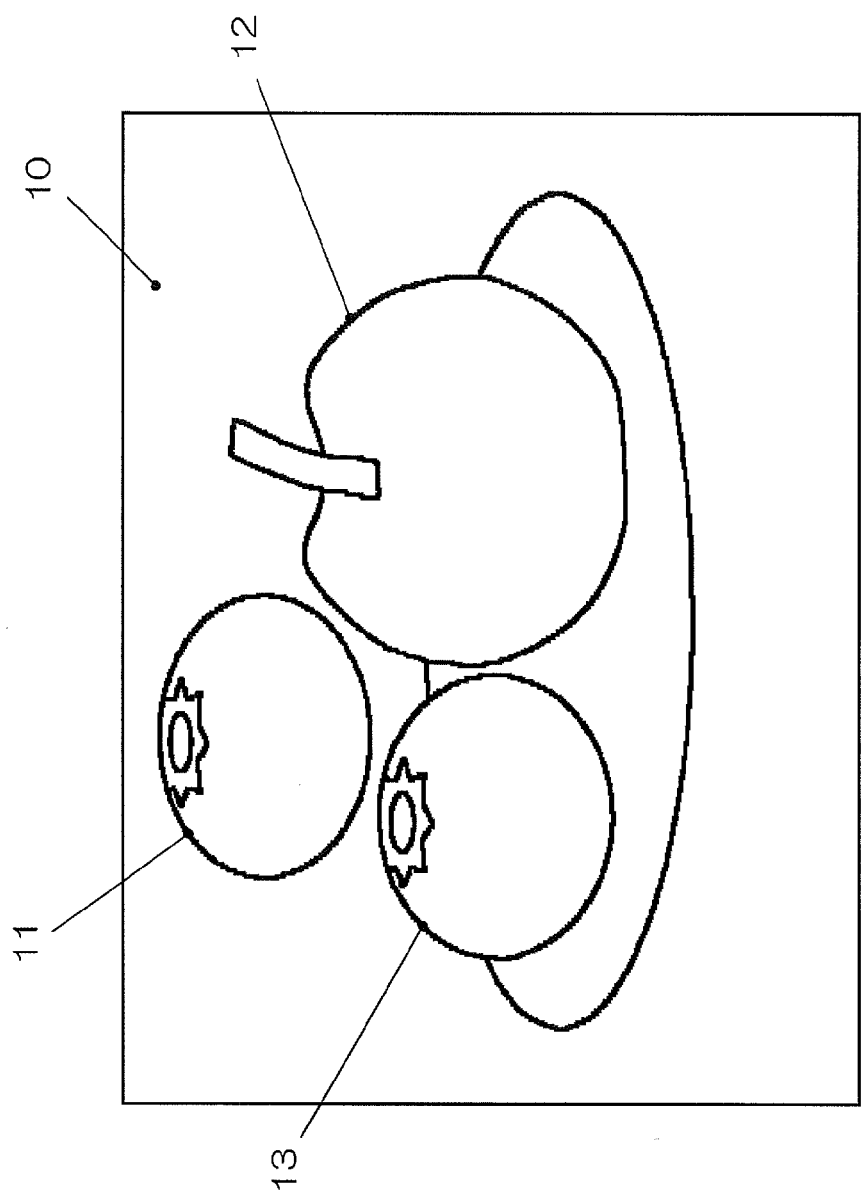
FIG. 4 is a diagram showing a display state of an input image displayed by the image processing apparatus 1.

As shown in FIG. 4, an input image 10, which was acquired by the image input unit 3 and is displayed on the display unit 5, includes a first subject 11, a second subject 12, a third subject 13, and the like. The following description will continue taking the example of the case where the user designates the first subject 11 as an unwanted subject among the three subjects.

Note that the input image 10 is digital data expressed in the YUV color space, for example, and can be subjected to digital processing by the control unit 2. Specifically, the input image 10 is constituted by M×N (e.g., 640×480) pixels, and each pixel has data indicating three values, namely a luminance Y and color differences U and V (referred to hereinafter as the "pixel value"). Note that since the image data format allows conversion between color spaces such as the RGB color space and the Lab color space, processing may be performed using the results of conversion into another color space as the pixel value.

As an initialization task, the control unit 2 divides the image 10 into k (k being an integer of two or more) initial segments (step S201). The centroids of these k initial segments are arranged evenly both vertically and horizontally in the image 10. The interval between adjacent centroids is S (pixels). FIG. 5 shows this initialized state, and in the example shown here, 20×15 initial segments 20 have been arranged evenly both vertically and horizontally.

Each segment is then given an individually unique label (step S202). For example, with the top-left segment in the screen serving as the first segment, the segments in FIG. 5 are given numbers k that increase to the right and downward in a line scanning manner. The label of the segment indicated by reference numeral 20 in this figure is k=54. This label may be a random number or a character such as an alphabet letter. Note that the labels are to be unique such that segments having the same label do not exist at the same time.

Next, the control unit 2 performs the processing of loop A on all of the pixels in the image 10 (step S203). In the processing of loop A, the processing of steps S204 and S205 is performed on each pixel in the image 10.

For each pixel, the control unit 2 calculates a distance Ds with respect to the centroid of each of the segments (step S204). This distance Ds is a value indicating similarity defined using the pixel value and the pixel location. Here, the smaller the distance Ds is, the higher the similarity of the pixel to the centroid of the segment is determined to be.

For example, in the case of the i-th pixel that is at the pixel location (xi,yi) and has the pixel value (Yi,Ui,Vi), the distance Ds to the k-th segment is calculated using Equation 1 below.

$$Ds = D1 + \frac{m^2}{S^2} D2 \qquad \text{Equation 1}$$
$$D1 = (Yi - Yk)^2 + (Ui - Uk)^2 + (Vi - Vk)^2$$
$$D2 = (xi - xk)^2 + (yi - yk)^2$$

Here, the centroid of the segment is at the pixel location (xk,yk) and has the pixel value (Yk,Uk,Vk). The initial values of this segment centroid may be the location of the corresponding segment centroid after the segments are evenly arranged as shown in FIG. 5, and the pixel value at that location.

Also, m is a coefficient for obtaining balance between the influence that a distance D1 based on the pixel value exerts on the distance Ds and the influence that a distance D2 based on the pixel location exerts on the distance Ds. This coefficient m may be determined in advance experimentally or empirically.

Next, the control unit 2 determines the segment that the target pixel i is to belong to using the distances Ds (step S205). Specifically, the segment that has the centroid corresponding to the lowest distance Ds is determined to be the affiliated segment for the target pixel i.

This processing in steps S204 and S205 is carried out on all of the pixels included in the image 10 (step S203), thus determining an affiliated segment for each of the pixels. Specifically, M×N data pieces given the labels of the segments to which the pixels belong are obtained. These data pieces will collectively be referred to hereinafter as a label image 21.

Next, the control unit 2 updates the centroid of each segment in which a belonging pixel was changed in the processing of loop A (step S206). Updating the centroids of the segments makes it possible to perform more accurate division processing. The control unit 2 then calculates the pixel location (xk,yk) and the pixel value (Yk,Uk,Vk) of the new centroid using Equation 2 below.

$$Yk = \frac{1}{N} \sum_{i=0, i \in k}^{N} Yi \qquad \text{Equation 2}$$

$$Uk = \frac{1}{N} \sum_{i=0, i \in k}^{N} Ui$$

$$Vk = \frac{1}{N} \sum_{i=0, i \in k}^{N} Vi$$

$$xk = \frac{1}{N} \sum_{i=0, i \in k}^{N} xi$$

$$yk = \frac{1}{N} \sum_{i=0, i \in k}^{N} yi$$

Here, Σ in Equation 2 represents the sum for all of the pixels included in the k-th segment, and N represents the total number of pixels included in the k-th segment.

Next, the control unit 2 determines whether or not the division processing is to be ended (step S207). If the division processing is to be continued (No in step S207), the processing of steps S203 to S206 is performed again, and the label image 21 is updated.

This end determination in step S207 may be a determination made by, for example, monitoring the updated state of the centroid in Equation 2. Specifically, if there is little change in the pixel location (xk,yk) and the pixel value (Yk,Uk,Vk) of the centroid between before and after the update, it is determined that the segment division processing is to be ended (Yes in step S207). Alternatively, the end determination may be made based on the number of times that steps S203 to S206 are repeated. For example, the segment division processing may be ended when the processing of steps S203 to S206 has been carried ten times.

The control unit 2 repeatedly updates the label image 21 in this way. As a result, the image 10 is divided into the segments 20 shown in FIG. 6. With the above-described updating, the shapes of the segments also change. However, the labels given to the segments are the same. Specifically, the label of the segment denoted by reference numeral 20 in FIG. 5 is k=54, and the label of the segment denoted by reference numeral 20 in FIG. 6 is also k=54. Characteristics such as the following can be seen by looking at FIG. 6. Firstly, the boundaries of the objects included in the image 10 (the first subject 11, the second subject 12, and the third subject 13) and the boundaries of the segments 20 match each other. Secondly, the sizes of the segments 20 are substantially uniform, and each object is made up of multiple segments 20. Moreover, it can be seen that no single segment 20 spans multiple objects.

Accordingly, it can be seen that in order for the user to designate the first subject 11, the user need only designate the segments included in the first subject 11. Since there is no need to designate a region in units of pixels by carefully tracing the outline portion of the first subject 11 as in conventional technology, the region designation can be executed through an easier task.

2-3. Operations in Region Designation Processing

Figure 2:
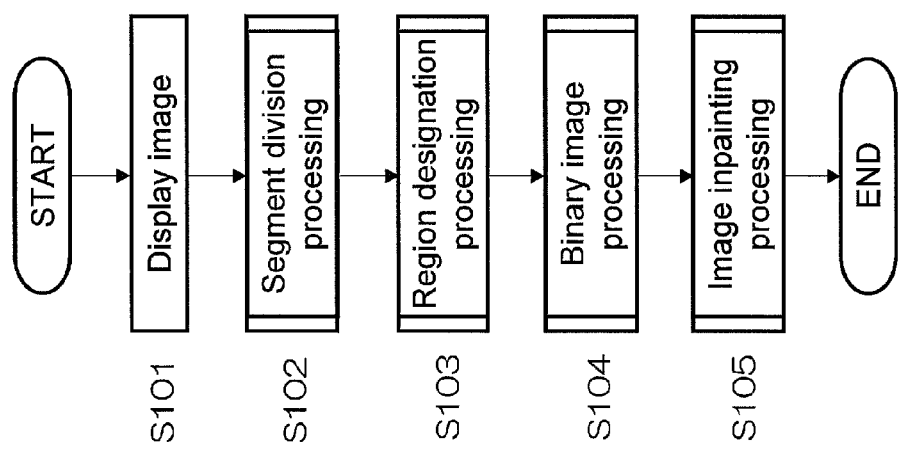
FIG. 2 is a flowchart showing operations of the image processing apparatus 1.
Figure 7:
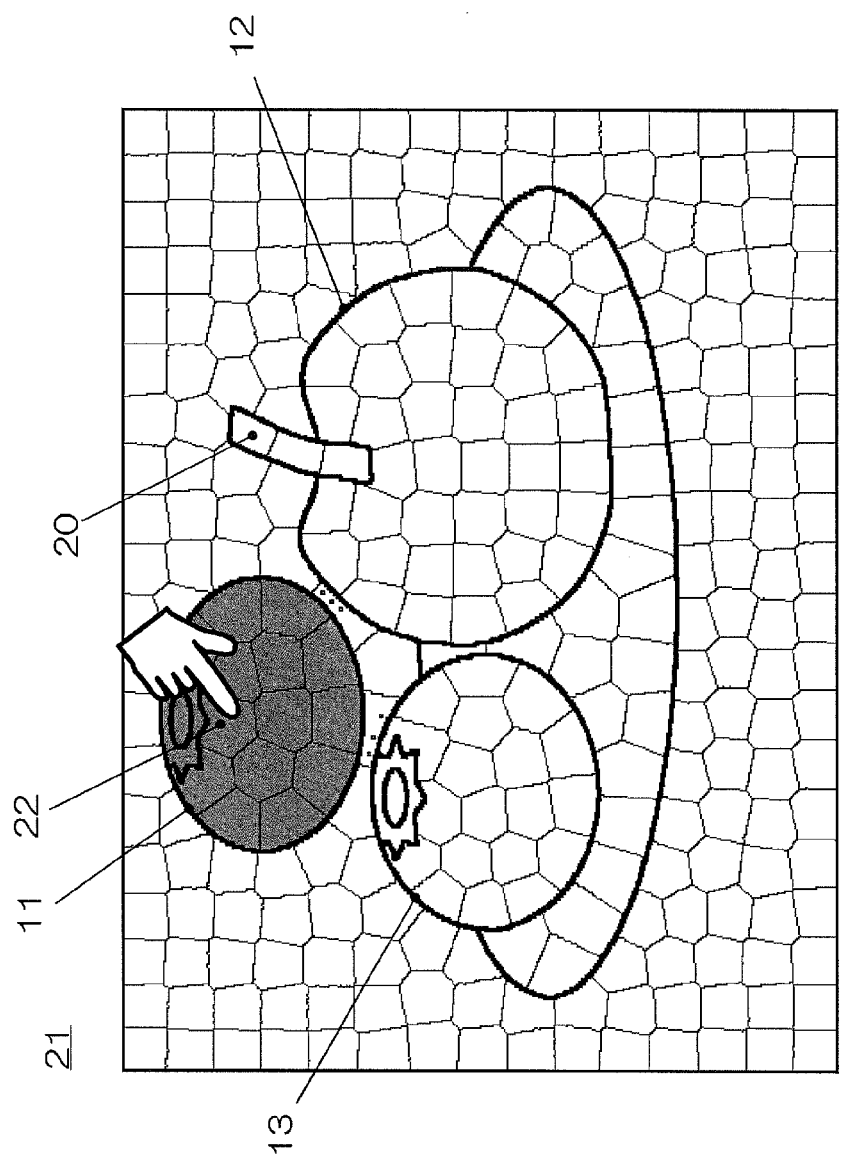
FIG. 7 is a diagram for describing a region designation operation performed by a user.

As shown in FIG. 2, after the control unit 2 has performed the segment division processing (step S102), the user selects one or more small regions (segments) so as to designate a region that is to be the target of image processing (step S103). The user successively taps a segment 22 and the like inside the first subject 11 for example, so as to select all of the segments included in the first subject 11. FIG. 7 is shows this state, and here all of the segments included in the first subject 11 are displayed in an emphasized manner.

Figure 8:
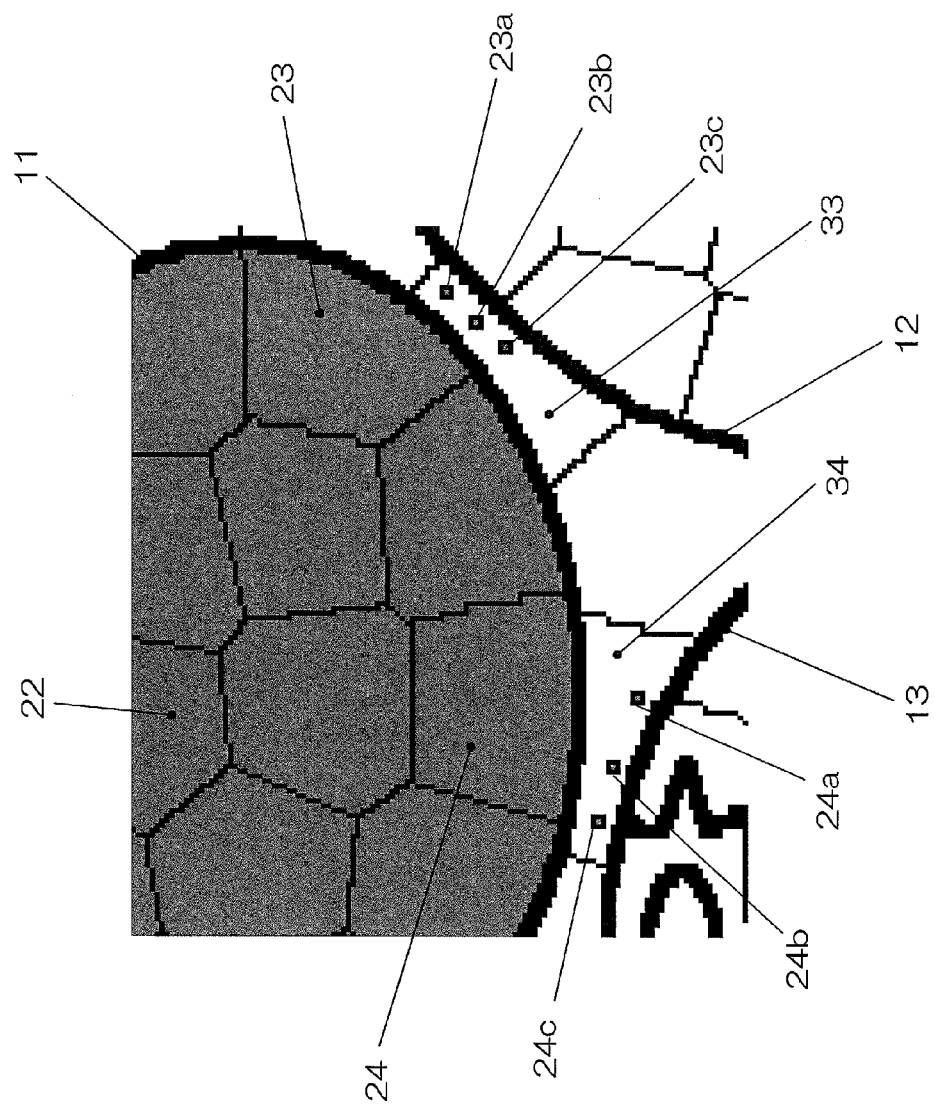
FIG. 8 is a diagram showing a state in which noise appears in segment division.

Next, the appearance of noise will be described with reference FIG. 8, which is an enlarged view of a portion in FIG. 7. As shown in FIG. 8, noise regions 23a, 23b, and 23c exist in a segment 33 located between the first subject 11 and the second subject 12 in the image 10. Similarly, noise regions 24a, 24b, and 24c exist in a segment 34 located between the first subject 11 and the third subject 13. Although these six noise regions are small dots located inside the segments 33 and 34, they belong to segments different from the segments 33 and 34. Specifically, the noise regions 23a, 23b, and 23c resulting from the segment division processing belong to a segment 23, and the noise regions 24a, 24b, and 24c belong to a segment 24.

There are cases where noise such as dark spots are recorded in the original image 10. Also, there are cases where noise appears during the compression/expansion of digital data during recording to the storage unit 4 or reproduction. Even when very fine patterns are scattered in the image, there are cases where they appear to be noise in a macroscopic view. Isolated spots such as those described above sometimes appear depending on these kinds of noise or the pixel values (luminance and color difference) of the pattern.

The following description takes the example of the pixel constituting the noise region 23c. It will be assumed that the luminance and color difference of this pixel completely match the pixel value at the centroid of the segment 23. However, it will be assumed that the pixel value of this pixel is completely different from the pixel values of the surrounding pixels. Accordingly, the following phenomenon occurs when the distance Ds to the centroids of each of the segments is calculated based on Equation 1 in step S204 in FIG. 3. Specifically, when calculating the distance Ds to the centroid of the segment 23, the distance D1 based on the pixel value will be 0, and only the distance D2 based on the pixel location will have a numerical value. On the other hand, when calculating the distance Ds to the centroid of the segment 33, the distance D2 based on the pixel location is thought to have a relatively small value, but the distance D1 based on the pixel value will have a very high value. For this reason, when the affiliated segment is determined based on the distance Ds in step S205, it will be determined that the distance to the segment 23 is small. On the other hand, it will be determined that the surrounding pixels belong to the segment 33, and therefore the noise region 23c will remain as an isolated spot separated from the segment 23.

For this reason, when the user selects the segment 23 inside the first subject 11, the noise regions 23a, 23b, and 23c, which are not originally included in the first subject 11, will also be included in the region targeted for image processing. Similarly, when the user selects the segment 24 inside the first subject 11, the noise regions 24a, 24b, and 24c, which are not included in the first subject 11, will also be included in the region targeted for image processing.

2-4. Operations in Binary Image Processing

Figure 9:
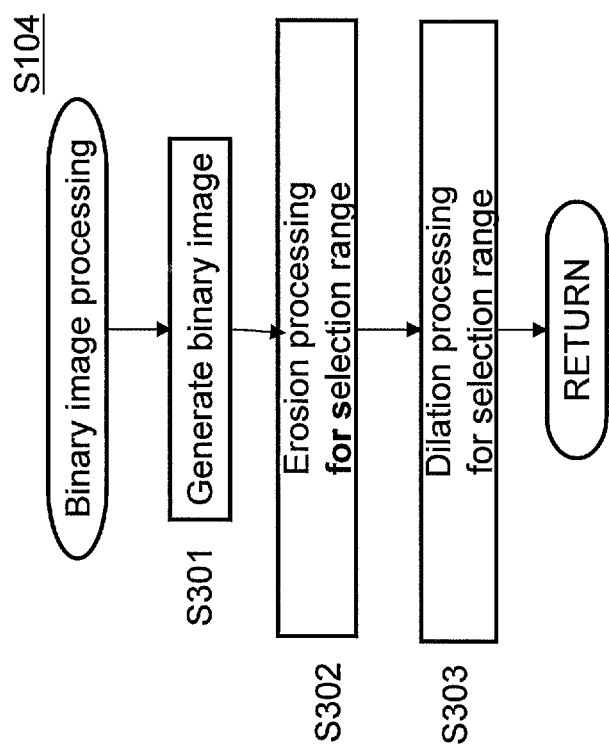
FIG. 9 is a flowchart showing operations in binary image processing performed by the image processing apparatus 1.
Figure 10:
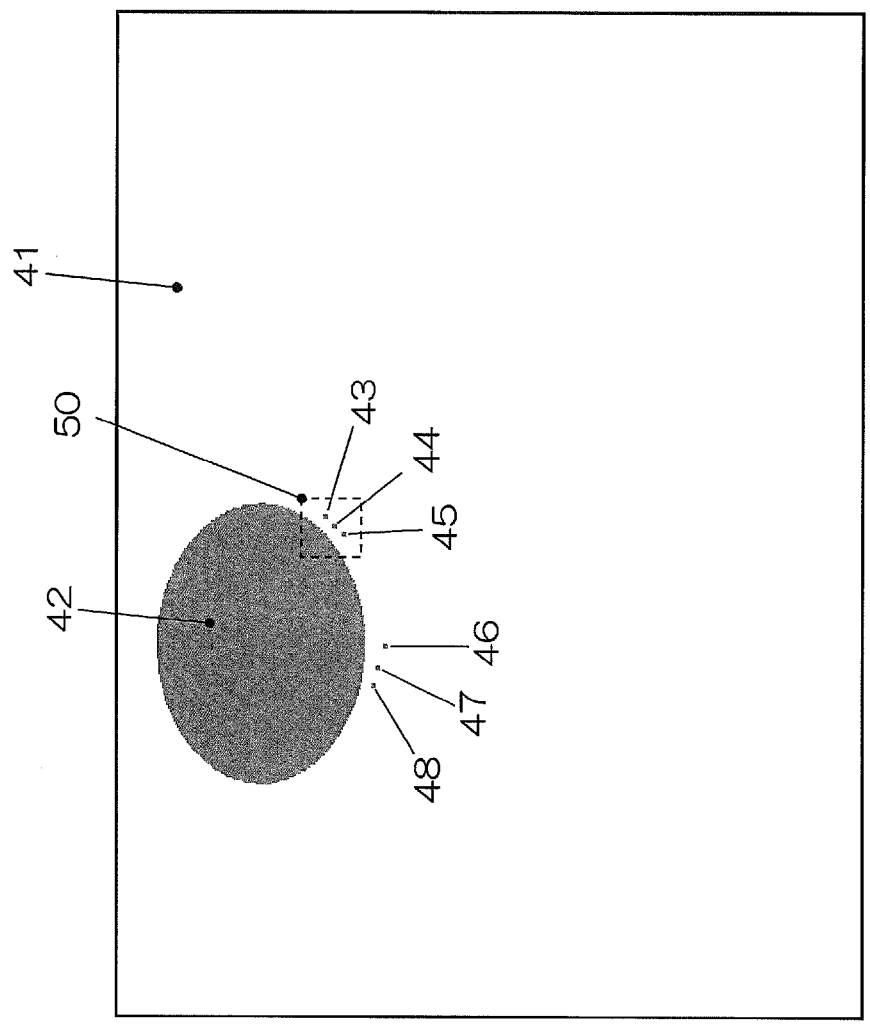
FIG. 10 is a diagram showing a state in which a selection range is generated as a binary image.
Figures 11A, 11B:
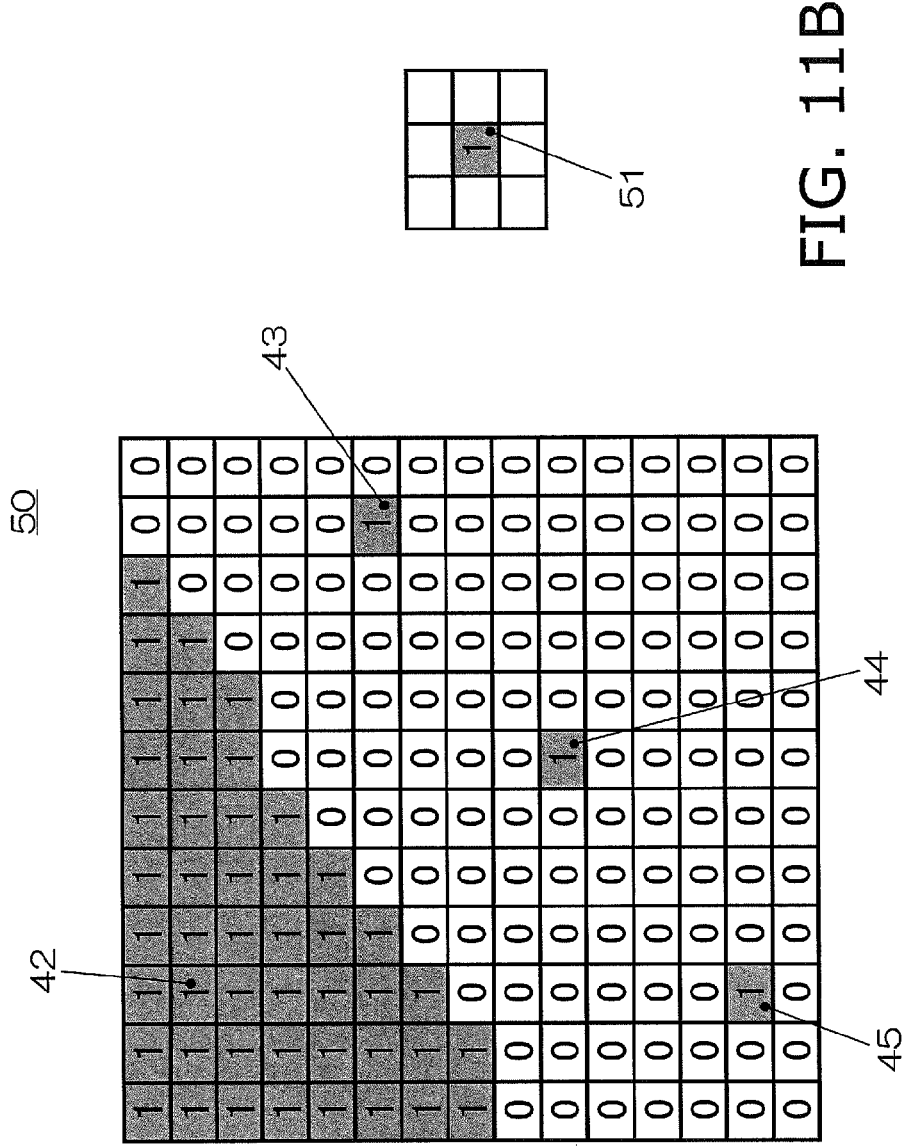
FIGS. 11A and 11B are diagrams showing the state of a generated binary image in units of pixels.
Figure 12A:
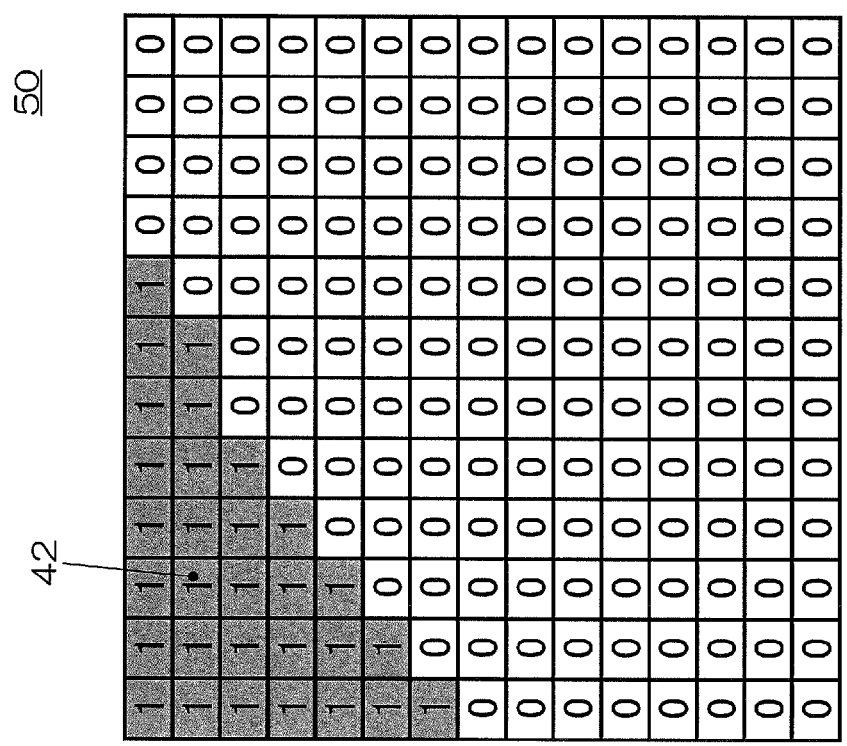
FIGS. 12A and 12B are diagrams showing the state of the binary image after erosion processing in units of pixels.
Figure 12B:
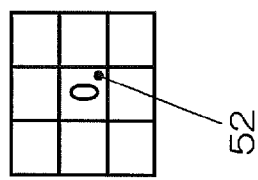
Figures 13A, 13B:
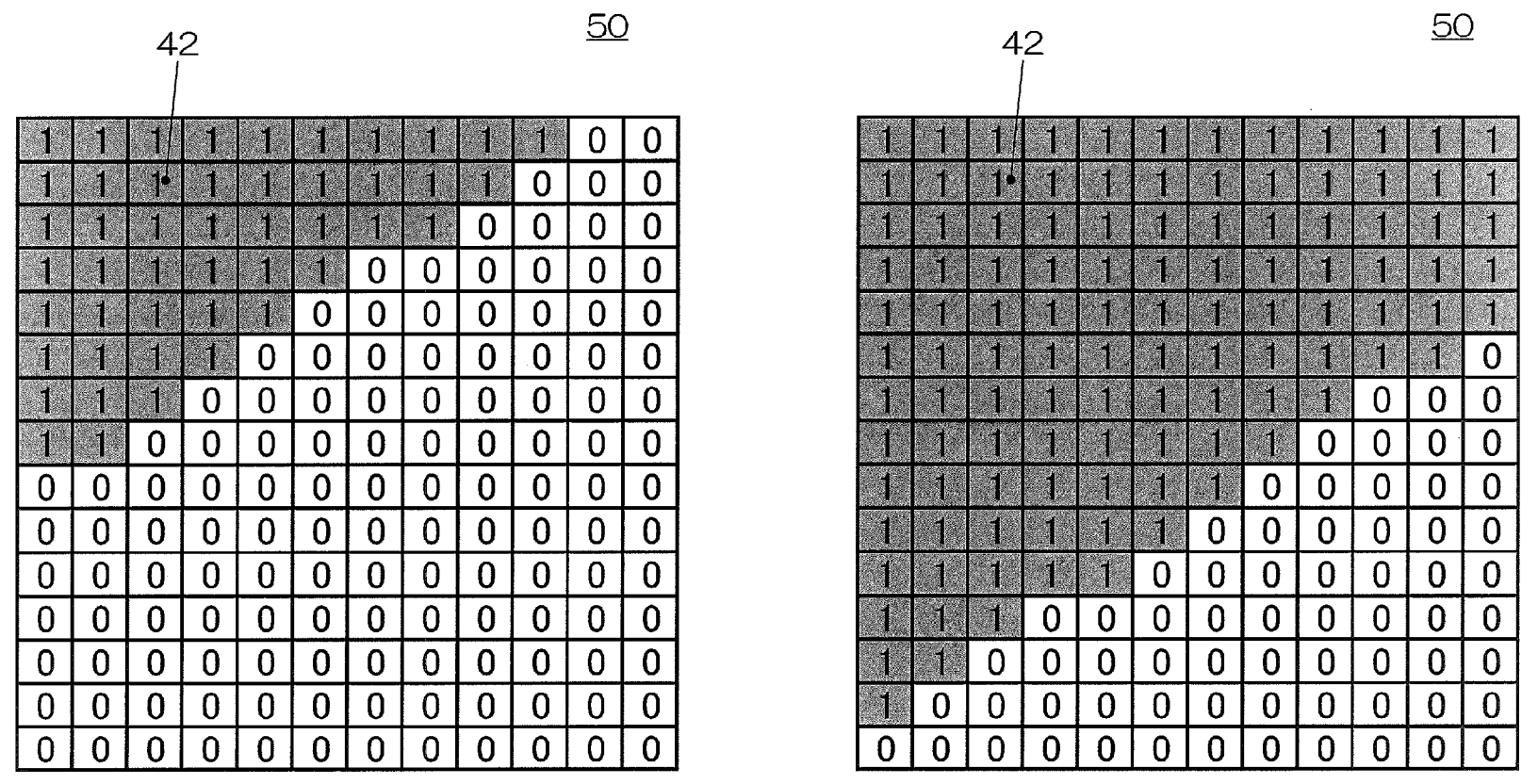

FIG. 9 is a flowchart showing operations in binary image processing. FIG. 10 is a diagram showing a state in which a selection range is generated as a binary image, and FIGS. 11A and 11B are enlarged views of portions in FIG. 10, and show the generated state of the binary image in units of pixels. Furthermore, FIGS. 12A and 12B are diagrams showing the state of the binary image after erosion processing in units of pixels. FIGS. 13A and 13B are diagrams showing the state of the binary image after dilation processing in units of pixels. FIG. 14 shows the selection range after the dilation processing.

The control unit 2 carries out the binary image processing in accordance with the flowchart in FIG. 9 as described below. First, a binary image in which all of the pixels included in the small regions (segments) selected by the user are set as the selection range is generated (step S301). The generated binary image is then subjected to selection range erosion processing (step S302), and then further subjected to selection range dilation processing (step S303). These operations will be described in detail below.

2-4-1. Binary Image Generation

The following describes the binary image generation method in step S301. In the region designation processing (step S103) in FIG. 2, the user selects all of the segments included in the first subject 11 as shown in FIG. 7. The pixels that are included in the segment 22 selected by the user can be easily specified as described below by referencing the label image 21 shown in FIG. 6. Specifically, the control unit 2 determines the affiliated segments of all of the pixels as it scans them in a line scanning manner from the top left of the label image 21 to the bottom right. For each of the pixels included in the segment 22, the control unit 2 determines "true" if the segment to which the pixel belongs is the segment 22 that was selected by the user, and determines "false" if otherwise. Similar processing is performed for the other segments 23 and 24 and the like that were selected by the user. By successively recording these results and performing a Boolean operation, the control unit 2 generates a binary image in which the pixels included in all of the segments selected by the user have a value of 1 (true), and the other pixels have a value of 0 (false). FIG. 10 shows an example of a binary image 41 generated in this way.

Note that in the example in FIG. 10, the pixels having the value of 1 are shown in gray, and the pixels having a value of 0 are shown in white, and the same follows for the other diagrams described hereinafter.

In this binary image 41, the region shown in gray is a selection range 42 made up of the pixels included in all of the segments selected by the user. It can be seen that the selection range 42 is a continuous region that conforms to the shape of the edges of the first subject 11. Note, however, that the selection range 42 also includes six isolated regions 43 to 48 that are isolated spots. These isolated spots correspond to the noise regions 23a to 23c, 24a to 24c, and the like that were described with reference to FIG. 8. For example, the noise regions 23a, 23b, and 23c belong to the segment 23. Accordingly, the determination result "true" is obtained when line scanning the label image 21, and therefore the noise regions 23a, 23b, and 23c have the value of 1 in the binary image 41. The isolated regions 43, 44, and 45 are therefore generated outside the first subject 11. Similarly, the noise regions 24a, 24b, and 24c belong to the segment 24, and thus isolated regions 46, 47, and 48 are generated.

2-4-2. Selection Range Erosion Processing

Next, selection range erosion processing (step S302) will be described with reference to FIGS. 11A and 11B and FIGS. 12A and 12B. FIG. 11A is an enlarged view of a partial region 50 indicated by a dashed-line rectangle in FIG. 10, and the state of the generated binary image is shown in units of pixels. As described above, the pixels that belong to the selection range 42 have a value of 1 and are shown in gray. The other pixels have a value of 0. FIG. 11A also shows the isolated regions 43, 44, and 45.

Next, the control unit 2 performs erosion processing on the entirety of the binary image 41. The erosion processing of the present embodiment is carried out as described below. As shown in FIG. 11B, the control unit 2 first selects a pixel having the value of 1 as a pixel of interest 51. The control unit 2 then determines the values of the eight adjacent pixels that surround the pixel of interest 51. If even one of the eight adjacent pixels is a pixel that has a value of 0, the value of the pixel of interest 51 is changed to 0. If all of the eight adjacent pixels have a value of 1, the value of the pixel of interest 51 is not changed (remains 1).

FIG. 12A shows the result of performing erosion processing on the binary image 41 in this way. The above-described erosion processing is similarly applied to the pixels in the isolated regions 43, 44, and 45, and therefore the values of these pixels are changed to 0 by definition. The erosion processing is similarly performed on the isolated regions 46, 47, and 48 shown in FIG. 10 as well. Specifically, by executing the above-described erosion processing on the isolated regions 43 to 48 of the selection range 42, one or more pixels are excepted by reduction.

It can be seen that as a result of this erosion processing, the selection range 42 is made smaller from the outside toward the inside (reduced in size). In other words, the selection range 42 is reduced by one or more pixels.

Note that rather than performing the above-described erosion processing only once, it may be executed multiple times consecutively. Even if the isolated regions 43, 44, and 45 are each made up of multiple pixels, they can be more reliably removed by carrying out the erosion processing multiple times.

2-4-3. Selection Range Dilation Processing

Next, selection range dilation processing (step S303) will be described with reference to FIGS. 12A and 12B and FIGS. 13A and 13B. The dilation processing of the present embodiment is carried out as described below. As shown in FIG. 12B, the control unit 2 first selects a pixel having the value of 0 as a pixel of interest 52. The control unit 2 then determines the values of the eight adjacent pixels that surround the pixel of interest 52. If even one of the eight adjacent pixels is a pixel that has a value of 1, the value of the pixel of interest 52 is changed to 1. If all of the eight adjacent pixels have a value of 0, the value of the pixel of interest 52 is not changed (remains 0).

FIG. 13A shows the result of performing dilation processing on the binary image 41 resulting from the erosion processing in this way. It can be seen that as a result of the above-described dilation processing, the selection range 42 is made larger from the inside toward the outside (expanded in size).

FIG. 13B shows the result of continuing to execute the dilation processing for a total of four times. It can be seen that the selection range 42 has further expanded from the inside toward the outside. In other words, the selection range 42 is expanded by a greater number of pixels than the number of pixels it was reduced in the erosion processing.

FIG. 14 shows the binary image 41 after the erosion processing was performed and then the dilation processing was executed four times consecutively as described above. As can be understood from a comparison with FIG. 11, the selection range 42 has expanded from the inside toward the outside. However, since the isolated regions 43 to 48 have already been removed through the erosion processing, they are not subjected to the dilation processing and do not exist in the binary image in FIG. 14.

Note that although it was described that the dilation processing is executed four times in the present embodiment, this is merely one example, and the number of times it is executed is not limited to this. The dilation processing may be executed any number of times as long as the number of pixels by which the selection range is expanded is greater than the number of pixels by which it was reduced through the erosion processing.

Also, the values of the eight adjacent pixels surrounding the pixel of interest are determined in the above-described dilation processing, but it is possible to determine the values of 24 pixels including the next 16 surrounding pixels. In this case, it is possible to increase the number of pixels by which the selection range is expanded when performing the dilation processing one time, thus increasing the efficiency of the calculation processing performed by the control unit 2.

2-5. Operations in Image Inpainting Processing 2-5-1. Image Inpainting Processing According to Present Embodiment FIGS. 15A to 15C are diagrams for describing image inpainting processing for removing an unnecessary object.

The control unit 2 performs the image inpainting processing (step S105 in FIG. 2) using the selection range 42 that underwent the binary image processing as the unnecessary region. FIG. 15A shows the image 10 that is the target of processing, and FIG. 15B shows a state in which the selection range 42 in the binary image is displayed so as to be superimposed on the image 10. The selection range 42 conforms to the shape of the edges of the first subject 11 and completely covers the first subject 11. Accordingly, the control unit 2 performs the image inpainting processing using the selection range 42 as the unnecessary region. Specifically, the first subject 11 inside the selection range 42 is removed from the image 10 by changing the pixel values in the selection range 42. The range of the first subject 11 that is to be removed can therefore be reliably specified and removed from the image as shown in FIG. 15C, and as a result, it is possible to perform natural inpainting processing.

2-5-2. Image Inpainting Processing According to Comparative Example

The following describes problems in cases where the erosion processing of step S302 or the dilation processing of step S303 is not carried out.

Figure 16C:
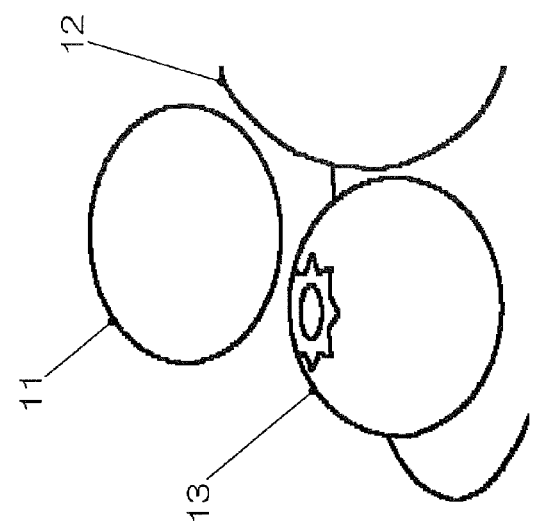
FIGS. 16A to 16C are diagrams for describing a problem in the case where dilation processing is not carried out.
Figure 16B:
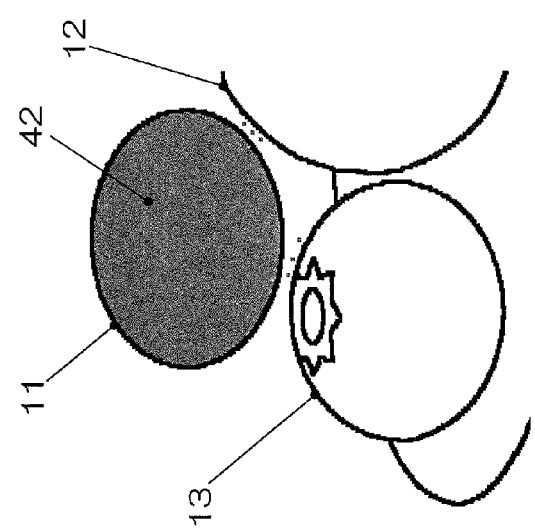
Figure 16A:
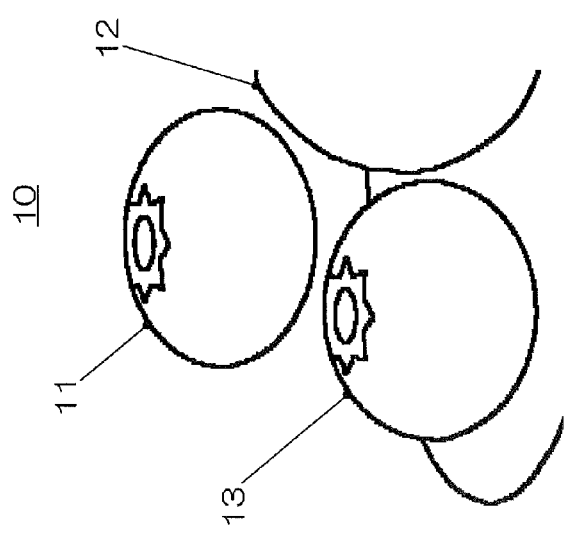
Figures 17A, 17B, 17C:
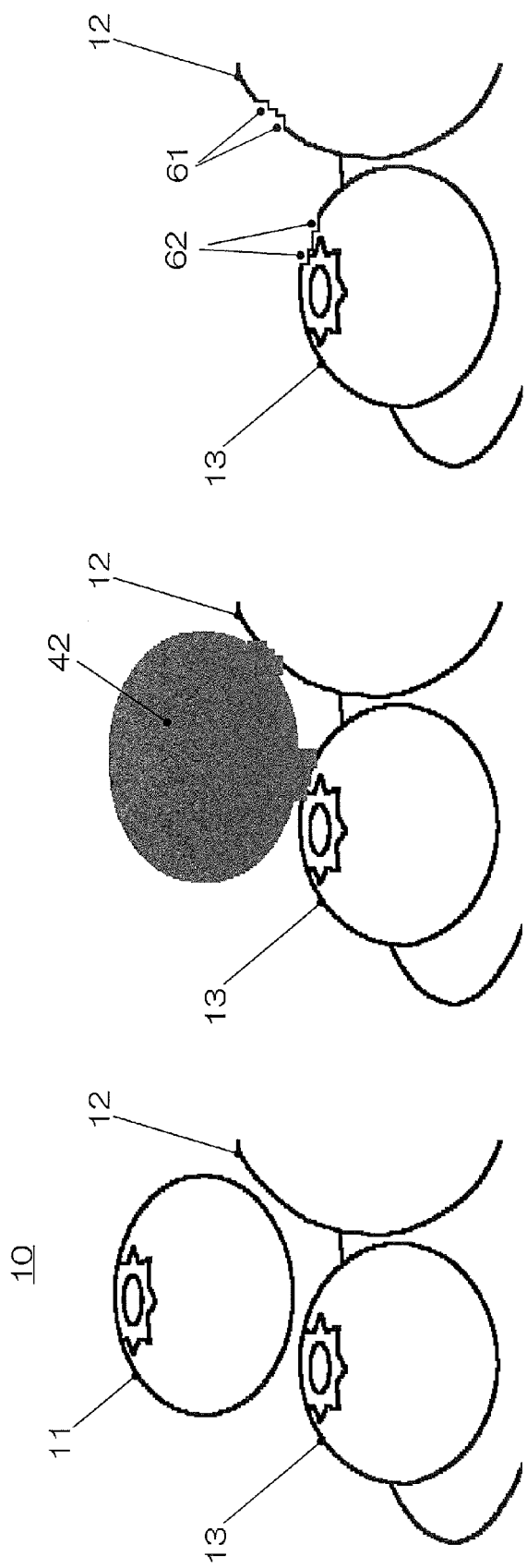
FIGS. 17A to 17C are diagrams for describing a problem in the case where erosion processing is not carried out.

FIGS. 16A to 16C are diagrams for describing a problem in the case where the image inpainting processing is performed without having carried out the dilation processing. FIGS. 17A to 17C are diagrams for describing a problem in the case where the image inpainting processing is performed without having carried out the erosion processing.

First, if the processing of steps S302 and S303 is not carried out, the binary image will remain in the state shown in FIG. 10. FIG. 16A shows the image 10 that is the target of processing, and FIG. 16B shows a state in which the selection range 42 in the binary image is displayed so as to be superimposed on the image 10. It can be seen that the selection range 42 favorably conforms to the shape of the edges of the first subject 11. However, the edges of the first subject 11 are not covered since the dilation processing of step S303 has not been performed. For this reason, when the image inpainting processing is performed using the selection range 42 as the unnecessary region, the result of the inpainting processing will be unnatural due to the edges of the first subject 11 remaining as shown in FIG. 16C.

It is common that the user designates a region surrounded by edges as an unnecessary object. These edges are groups of pixels that have different pixel values (luminance and color difference) from both the inside of the unnecessary region and the outside thereof. As can be seen in FIG. 8, the first subject 11, the second subject 12, and the third subject 13 all have edges, and these edges are curved lines that have a width of two or more pixels. Also, sometimes there is a shadow that conforms to an edge, and the width of the edge often further increases in size when the shadow is included.

For this reason, in the segment division processing of step S102 in FIG. 2, it is not possible to determine whether edge pixels are to belong to a segment inside the first subject 11 or are to belong to a segment outside of it. For this reason, even if the user selects all of the segments that are included in the first subject 11 in the region designation processing of step S103, at least a portion of the edges will not be included in the selection range 42.

On the other hand, the dilation processing of step S303 is carried out in the image processing apparatus 1 of the present embodiment, and therefore the selection range 42 can completely cover the edges of the first subject 11 as shown in FIG. 15B.

The following describes a problem in the case where the image inpainting processing is performed without having carried out the erosion processing of step S302. In this case, the image inpainting processing is performed using the selection range 42 that has been subjected to only the dilation processing of step S303 as the unnecessary region. FIG. 17A shows the image 10 that is the target of processing, and FIG. 17B shows a state in which the selection range 42 in the binary image in this case is displayed so as to be superimposed on the image 10. The selection range 42 favorably conforms to the shape of the edges of the first subject 11 and covers it. However, new regions shaped as horns extending all the way to the second subject 12 and the third subject 13 appear. These regions are the result of the isolated regions 43 to 48 shown in FIG. 10 being expanded through the dilation processing. For this reason, when the image inpainting processing is performed using the selection range 42 as the unnecessary region, flaws 61 appear in an edge of the second subject 12 as shown in FIG. 17C. Similarly, flaws 62 appear in an edge of the third subject 13, and the result of the inpainting processing is unnatural.

On the other hand, since the erosion processing of step S302 is carried out before the dilation processing in the image processing apparatus 1 of the present embodiment, the isolated regions 43 to 48 can be eliminated in advance.

3. Variations

The erosion processing of step S302 described in the above embodiments can also be replaced with a processing method such as the following. Specifically, as shown in FIG. 11B, the control unit 2 first selects a pixel having the value of 1 as the pixel of interest 51. The control unit 2 then determines the values of the eight adjacent pixels that surround the pixel of interest 51. Here, the number of pixels that have the value of 0 is counted, and this number n is compared with a threshold value p. If n≥p, the value of the pixel of interest 51 is changed to 0. If n<p, the value of the pixel of interest 51 is not changed (remains 1). The value of p can be selected from 1 to 8.

If the value of p is p=8, the value of the pixel of interest 51 is changed to 0 only if all of the eight adjacent pixels surrounding the pixel of interest 51 have the value of 0. Performing this erosion processing on the binary image 41 shown in FIG. 11A makes it possible to remove only the isolated regions 43, 44, and 45. In other words, the same binary image as in FIG. 13A can be obtained, thus making it possible to reduce the number of times that the dilation processing of step S303 is executed, which is favorable in terms of efficiency. In other words, if the value of 6 or more is set as the threshold value p, the erosion processing method of this variation is used in step S302. This enables reducing (or removing) only isolated regions that exist on their own without influencing the selection range 42 that is a comparatively larger continuous region.

4. Conclusion

As described above, with the image processing apparatus 1 of the present embodiment, an image is divided into multiple small regions (segments) (step S102 in FIG. 2), a user selects one or more of the small regions (segments) (step S103 in FIG. 2), a selection range made up of the pixels included in the selected small regions (segments) is specified (step S301 in FIG. 9), erosion processing for reducing the selection range by at least one or more pixels is performed (step S302 in FIG. 9), and then dilation processing for expanding the selection range by a greater number of pixels than the number of pixels by which it was reduced in the erosion processing is performed (step S303 in FIG. 9). The processing of this image processing apparatus 1 enables designating the selection range 42 in line with the user's intention as shown in FIG. 15B, and enables obtaining more natural image processing results.

Furthermore the image processing apparatus 1 of the present embodiment performs image inpainting processing using the selection range resulting from the dilation processing as an unnecessary region (step S105 in FIG. 2). Accordingly, a more natural processing result as shown in FIG. 15C can be obtained in the image inpainting processing for removing the unnecessary object.

Other Embodiments

Some or all of the processing in the above-described embodiments may be realized by computer programs. Also, some or all of the processing executed by the image processing apparatus 1 is executed by a processor such as a central processing unit (CPU) in a computer. Also, programs for executing the processing are stored in a storage device such as a hard disk or a ROM, and are executed in the ROM or read out to a RAM and then executed.

Also, the processing executed by the image processing apparatus 1 may be realized by hardware, or may be realized by software (including the case of being realized together with an OS (operating system), middleware, or a predetermined library). Furthermore, such processing may be realized by a combination of software and hardware.

The image processing apparatus 1 of the above-described embodiments may be realized as an image processing method or a computer program for causing a computer to execute image processing. Also, a computer-readable recording medium recording the program is encompassed in the present invention. Here, examples of the computer-readable recording medium include a flexible disk, a hard disk, a CD-ROM, an MO, a DVD, a DVD-ROM, a DVD-RAM, a BD (Blu-ray Disc), and a semiconductor memory.

The computer program is not limited to being recorded on the recording medium, and may be transmitted via, for example, an electrical communication line, a wireless or wired communication line, or a network typified by the Internet.

Also, the execution sequence of the image processing in the above-described embodiments is not necessarily limited to the description of the above embodiments, and the steps in the execution sequence can be interchanged without departing from the gist of the invention.

Embodiments have been described above as illustrative examples of techniques of the present invention. The accompanying drawings and detailed description have been provided for this purpose.

Accordingly, the constituent elements included in the accompanying drawings and the detailed description may include not only constituent elements that are essential to solving the problem, but also constituent elements that are not essential to solving the problem, in order to illustrate examples of the techniques. For this reason, these non-essential constituent elements should not be immediately found to be essential constituent elements based on the fact that they are included in the accompanying drawings or detailed description.

Also, the above-described embodiments are for illustrating examples of the techniques of the present invention, and therefore various modifications, substitutions, additions, omissions, and the like can be made within the scope of the claims or a scope equivalent thereto.

The present disclosure is applicable to electronic devices that have an image display function, such as digital cameras, digital video cameras, personal computers, mobile phones, and information terminals.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the image processing apparatus and image processing method. Accordingly, these terms, as utilized to describe the technology disclosed herein should be interpreted relative to the image processing apparatus and image processing method.

The term "configured" as used herein to describe a component, section, or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicants, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed:

1. An image processing apparatus that performs region designation with respect to a displayed image, the image processing apparatus comprising:
    a display device to display an image constituted by a predetermined number of pixels;
    an input device configured to receive a selection operation with respect to the image; and
    a processor programmed to control the display device and the input device, the processor being further configured to:
    generate a plurality of divided regions by dividing the image in accordance with similarity calculated based on pixel values and pixel locations;
    identify a selection range constituted by one or more of the plurality of divided regions in accordance with the selection operation received by the input device;
    perform erosion processing with respect to the selection range by reducing a number of pixels constituting the selection range; and
    perform dilation processing with respect to the selection range resulting from the erosion processing by increasing the number of pixels constituting the selection range resulting from the erosion processing,
    the number of pixels constituting the selection range resulting from the dilation processing being greater than the number of pixels constituting the selection range before the erosion processing and wherein,
    the processor is programmed to perform the erosion processing with respect to the selection range for a first number of times, and perform the dilation processing with respect to the selection range resulting from the erosion processing for a second number of times, the second number being greater than the first number.

2. The image processing apparatus according to claim 1, wherein:
    the processor is programmed to remove an image subject in the selection range resulting from the dilation processing by changing the pixel values in the selection range resulting from the dilation processing.

3. The image processing apparatus according to claim 1, wherein:
    the processor is programmed to identify the selection range by performing, before the erosion processing, binary image processing that discriminates pixels constituting the identified one or more of the plurality of divided regions from pixels constituting other regions than the identified one or more of the plurality of divided regions.

4. The image processing apparatus according to claim 1, wherein:
    the processor is programmed to generate the plurality of divided regions by repeatedly dividing the image in accordance with the similarity calculated based on pixel values and pixel locations.

5. An image processing apparatus that performs region designation with respect to a displayed image, the image processing apparatus comprising:
    a display device to display an image constituted by a predetermined number of pixels;

an input device configured to receive a selection operation with respect to the image; and a processor programmed to control the display device and the input device, the processor being further configured to:

generate a plurality of divided regions by dividing the image in accordance with similarity calculated based on pixel values and pixel locations;

identify a selection range constituted by one or more of the plurality of divided regions in accordance with the selection operation received by the input device;

perform erosion processing with respect to the selection range by reducing a number of pixels constituting the selection range;

perform dilation processing with respect to the selection range resulting from the erosion processing by increasing the number of pixels constituting the selection range resulting from the erosion processing, the number of pixels constituting the selection range resulting from the dilation processing being greater than the number of pixels constituting the selection range before the erosion processing and wherein, the plurality of divided regions being generated by the processor makes one or more pixels that belong to the one or more of the plurality of divided regions selected by the selection operation and are not continuous to the identified selection range.

6. The image processing apparatus according to claim 5, wherein:

the processor is programmed to except the one or more pixels that are not continuous to the identified selection range from one or more pixels that belongs to the one or more of the plurality of divided regions selected by the selection operation by performing the erosion processing.

7. An image processing method for performing region designation with respect to an image displayed on a display device, the image processing method including:

displaying an image constituted by a predetermined number of pixels;

receiving a selection operation with respect to the image;

controlling the display device and an input device, a processor further:

generating a plurality of divided regions by dividing the image in accordance with similarity calculated based on pixel values and pixel locations;

identifying a selection range constituted by one or more of the plurality of divided regions in accordance with a selection operation;

performing erosion processing with respect to the selection range by reducing a number of pixels constituting the selection range; and performing dilation processing with respect to the selection range resulting from the erosion processing by increasing the number of pixels constituting the selection range resulting from the erosion processing, the number of pixels constituting the selection range resulting from the dilation processing being greater than the number of pixels constituting the selection range before the erosion processing; and performing the erosion processing with respect to the selection range for a first number of times, and performing the dilation processing with respect to the selection range resulting from the erosion processing for a second number of times, the second number being greater than the first number.

\* \* \* \* \*